United States Patent

Csaszar et al.

[11] Patent Number: 5,970,124
[45] Date of Patent: Oct. 19, 1999

[54] SPONSORED INFORMATION DISTRIBUTION METHOD AND APPARATUS

[75] Inventors: John J. Csaszar, Fleetwood; Michael Cudemo, III, Downingtown; Marc A. Cohen, Philadelphia, all of Pa.

[73] Assignee: Voice FX Corporation, Conshohocken, Pa.

[21] Appl. No.: 08/869,753

[22] Filed: Jun. 5, 1997

Related U.S. Application Data

[60] Provisional application No. 60/019,177, Jun. 5, 1996, provisional application No. 60/023,258, Aug. 9, 1996, provisional application No. 60/023,256, Aug. 9, 1996, provisional application No. 60/024,006, Aug. 15, 1996, and provisional application No. 60/026,307, Sep. 18, 1996.

[51] Int. Cl.$^6$ .............................. H04M 1/64; H04M 11/00
[52] U.S. Cl. ............................ 379/88.18; 379/70; 379/76; 379/88.05; 379/93.12; 379/101.01; 379/88.01
[58] Field of Search ..................... 379/67.1, 76, 88.01, 379/88.05, 88.18, 93.12, 101.01, 70

[56] References Cited

U.S. PATENT DOCUMENTS

| | | | |
|---|---|---|---|
| 4,539,435 | 9/1985 | Eckmann | 379/76 |
| 4,594,476 | 6/1986 | Freeman | 379/76 |
| 4,850,007 | 7/1989 | Marino et al. | 379/67.1 |
| 4,974,254 | 11/1990 | Perine et al. | 379/100 |
| 4,978,305 | 12/1990 | Kraft | 434/353 |
| 5,002,491 | 3/1991 | Abrahamson et al. | 434/322 |
| 5,434,908 | 7/1995 | Klein | 379/88 |
| 5,548,749 | 8/1996 | Kroenke et al. | 395/600 |
| 5,572,643 | 11/1996 | Judson | 395/793 |
| 5,655,015 | 8/1997 | Walsh et al. | 379/201 |
| 5,727,950 | 3/1998 | Cook et al. | 379/201 |
| 5,732,216 | 3/1998 | Logan et al. | 395/200.33 |
| 5,757,644 | 5/1998 | Jorgensen et al. | 364/188 |

Primary Examiner—Fan S. Tsang
Assistant Examiner—Allan Hoosain
Attorney, Agent, or Firm—Antton & Associates, P.C.

[57] ABSTRACT

A database having information which the consumer desires to know, a database containing attributes of the consumer, and a database of advertising messages that an interactive voice response system can deliver to a the consumer are made responsive to telephone calls placed to an interactive voice response (IVR) system. The database of consumer attributes contains information that is already known about the consumer that can be used to decide on which advertising message to play. The consumer initiates activity by calling the interactive voice response system. Software identifies the consumer via the consumer inputted identification and plays an advertising message that, preferably, has been predetermined to have likely appeal to the consumer. The interactive voice response system is then used to disseminate the information sought by the customer (such as student grades) after first disseminating the advertising message. The advertising message can include an offer to purchase a product or service. The offer can be taken during the advertising period and recorded so as to be sent to a sponsor.

18 Claims, 4 Drawing Sheets

SPONSORED INFORMATION DISTRIBUTION METHOD AND APPARATUS

RELATED APPLICATIONS

This application, claims the benefit of Provisional Applications Ser. Nos. 60/019,177 filed Jun. 5, 1996, 60/023,258 filed Aug. 9, 1996, 60/023,256 filed Aug. 9, 1996, 60/024,006 filed Aug. 15, 1996 and 60/026,307 filed Sep. 18, 1996, all of which are herein incorporated by reference.

BACKGROUND AND SUMMARY OF THE INVENTION

Interactive voice response (IVR) systems are answering machines that can interact with a caller and provide information 24 hours a day. Interactive voice response systems have found particular favor with large corporations that engage in large numbers of telephone transactions that involve disseminating essentially the same types of information to each caller. These systems can be updated frequently and automatically.

The technology employed by interactive voice response systems is often not economical for small institutions that do not maintain a high volume of telephone calls seeking a particular type of information. One example is a school or a university that seeks to use interactive voice response systems to report grades to their students. Reporting grades by telephone is extremely convenient for students. Students usually leave their campus at the end of each semester or quarter as quickly as possible—and often before professors have graded their final exams and reported them to their respective schools and universities. Telephone grade reporting allows students to know their grades without having to physically review posted grade sheets at the university or to wait, perhaps for months, for the university to mail the grades.

A problem that schools and universities encounter in using interactive voice response systems is how infrequently they are used intensively. Students need to find their grades by telephone only at the end of a quarter or semester. This message traffic can be quite heavy, but only for a few weeks of the year, schools and universities make no other use of their interactive voice response systems. The interactive voice response system still must be robust enough to support a high volume of phone calls. The equipment required to be purchased by a school or university to conduct grade reporting using interactive voice response system is therefore high. Furthermore, the interactive voice response industry is prone to rapid technological improvements such that interactive voice response systems quickly become obsolete.

Considerable economies of scale can be realized by combining the grade reporting requirements of several schools using a single set of interactive voice response equipment. However, different schools and universities often have automated grade reporting systems that are incompatible with each other as well as with interactive voice response systems. This system incompatibility presents a major problem in realizing significant economies of each scale since different schools and universities cannot share the use of the same interactive voice response equipment without extensive and expensive modifications.

It is known that the ability to target particular advertisements and offers to those consumers who are most apt to be interested in receiving such messages have great value to advertisers and marketers. Advertisers and marketers are often willing to pay a premium to reach consumers with advertisements and offers that are directed to their individual anticipated needs and interests. Direct advertisers and marketers have learned that consumers share particular attributes and often have comparable needs and interests based on certain demographic variables. Even more important, advertisers and marketers are willing to pay to have their offers and advertisements directed to the individuals who are most receptive.

It is a part of the present invention to recognize that the well known predispositions of advertisers and marketers to pay for well directed advertisements and offers can be used to offset the costs associated with providing interactive voice response systems to institutions, such as schools and universities, who use such systems intensively but infrequently. The advertisements and offers from multiple sponsors can be pooled at a common ADs server. Likewise, grades from a number of different schools can be mapped into a common format that is suitable for use by interactive voice response equipment. In addition to grades, other demographic and sociological indications (collectively herein referred to as "attributes") can be supplied in addition to the grades. These student attributes can then be utilized to direct advertisements and offers to particular students. The advertising and offering process can be enhanced over time by using information derived from some students to enhance the advertisements and offers played to later students.

Further economies of scale can be realized by employing a single set of interactive voice response systems which can then be recycled among a number of different schools. In this way, individual schools are freed of the necessity to purchase their own interactive voice response equipment while advertisers and marketers are permitted access to the tastes and interests of individual students. Hence, schools, universities, and even individuals can offer interactive voice response technology where such offerings previously would not have been economically feasible.

One advantage of interactive voice response systems is that they can deliver information that consumers desire at any time and at low cost. Reporting course grades to students is only one example of the capability of the technology; each student desiring to know his or her grades for a semester can call a toll-free number that is connected to the interactive voice response system. Utilizing passwords or other forms of identification, the information can be delivered to a particular student quickly and with confidentiality. Students appreciate the ability to learn their grades from a remote location in advance of a formal grade report. Students and other consumers often do not object to having advertisers and marketers pay the cost of being able to access their grades. Indeed, students often enjoy the often creative advertisements and offers for products and services. Other forms of information dissemination in addition to grade reporting are also possible.

The ability to target particular advertisements and offers to those consumers who are apt to be interested in the messages has great value to advertisers and marketers. Advertisers and marketers are often willing to pay a premium to reach these consumers with advertisements and offers that are directed to their anticipated needs and interests. Direct advertisers and marketers have learned that consumers that share particular attributes often have comparable needs and interests. Even more important, interactive voice response equipment allows advertisers and marketers to adapt their messages to consumers. The revenue that these advertisers and marketers can be expected to be willing to pay could be used to offset the cost of disseminating information.

There is a need in the art to establish a way to direct advertising (the spoken word) and offers (the taking of orders) (herein collectively referred to as "advertising messages") to consumers using interactive voice response systems to particular target markets e.g., those individuals who are or are most likely to be most receptive to the information. There is also a need for a way to defer the expenses associated with interactive voice response systems. Among the objectives of the present invention are to solve these two problems. It is a further objective of the present invention to solve these problems together. It is also an objective of the present invention to start with a database of information about various consumer characteristics, demographic and other characteristics and to direct advertising messages to these consumers based on these known attributes. The present invention also rewards vendors of goods or services for disseminating information, while allowing these vendors to direct their advertisements to those consumers whom they believe are most apt to have an interest in their products or services. It is also an objective of the present invention to convey information and advertising messages to consumers based on information that is already known about the consumer.

The present invention achieves these objectives, and others, by applying a database having information which the consumer desires to know, a database containing attributes of the consumer, and a database of advertisements that an interactive voice response system can deliver to a the consumer. The database of consumer attributes can contain information that is already known about the consumer. The consumer initiates activity by calling the interactive voice response system. Software identifies the consumer via the consumer inputted identification and plays an advertising message that, preferably, has been predetermined to have likely appeal to the consumer. The interactive voice response system is then used to disseminate the information sought by the customer (such as student grades) after first disseminating the advertising message.

The present invention has the particular advantage of individuals, schools and universities to disseminate grade information using interactive voice response technology which otherwise may be too expensive to maintain. Advertisers and marketers wanting to target advertising messages to the consumer using the interactive voice response system pay part or all of the cost of reporting the student's grades. The ability of advertisers and marketers to better direct advertisements to those customers who are most interested in the product or service being sold has great value to advertisers and marketers. Similarly consumers benefit because they perceive value in receiving advertisements or offers for the products or services which they may reasonably be expected to have an interest in purchasing. And consumers can avoid the advertising messages entirely simply by not calling.

One particularly efficient application of the present invention is in distributing grade reports to students. Students generally want to know their grades promptly at the end of every semester. Universities have the problems and costs associated with getting this information to students. Interactive voice response systems are a natural vehicle for disseminating grade information. Universities know many attributes of their students that have value to advertisers and marketers. For example, a university will know the sex, age, year in school, major course of study, address and additional attributes. Advertisers and marketers can direct advertising messages to students based on these known attributes without knowing the true identity of the person. For example, a consumer electronics company can market to engineering majors only, by advertising the price or opportunity to order, a specialized engineering calculator. Also, female oriented products can be marketed to females only. Advertising revenues can be used to offset the price of disseminating the grade reports.

The features necessary to implement the present invention include a database of attributes of particular individuals. Attributes can be supplied by the schools and mapped into a database so that the identity, and privacy, of the student is never known to an individual advertiser. The consumer can be assigned a password or similar identification which identifies his or her attributes. The consumers attributes, however derived, must then be used to quickly and accurately select an advertisement of interest to the individual consumer. The sorting process needs to be flexible so as to accommodate the different interests of particular advertisers and marketers fast enough that consumers are not annoyed by any delay. One way of achieving this objective is to determine in advance of a call which advertising message to play, and in what order to play multiple messages, based on the consumer's known attributes.

It is advantageous to maintain a record of the attributes of consumers who access a particular database so that advertisers and marketers have assurance that their advertising messages are being targeted to those consumers who are most apt to have an interest in the particular goods or services. It is also advantageous to record how many times a particular advertising message meets the desired target audience. These advantages are easily obtained with the present invention by maintaining a network between the interactive voice response equipment and a separate server that stores which advertising message to play and then transmits its instructions.

The foregoing objectives, features and advantages of the present invention, and others in addition, are illustrated below with the aid of the drawings and detailed description.

DETAILED DESCRIPTION

Figure 1:
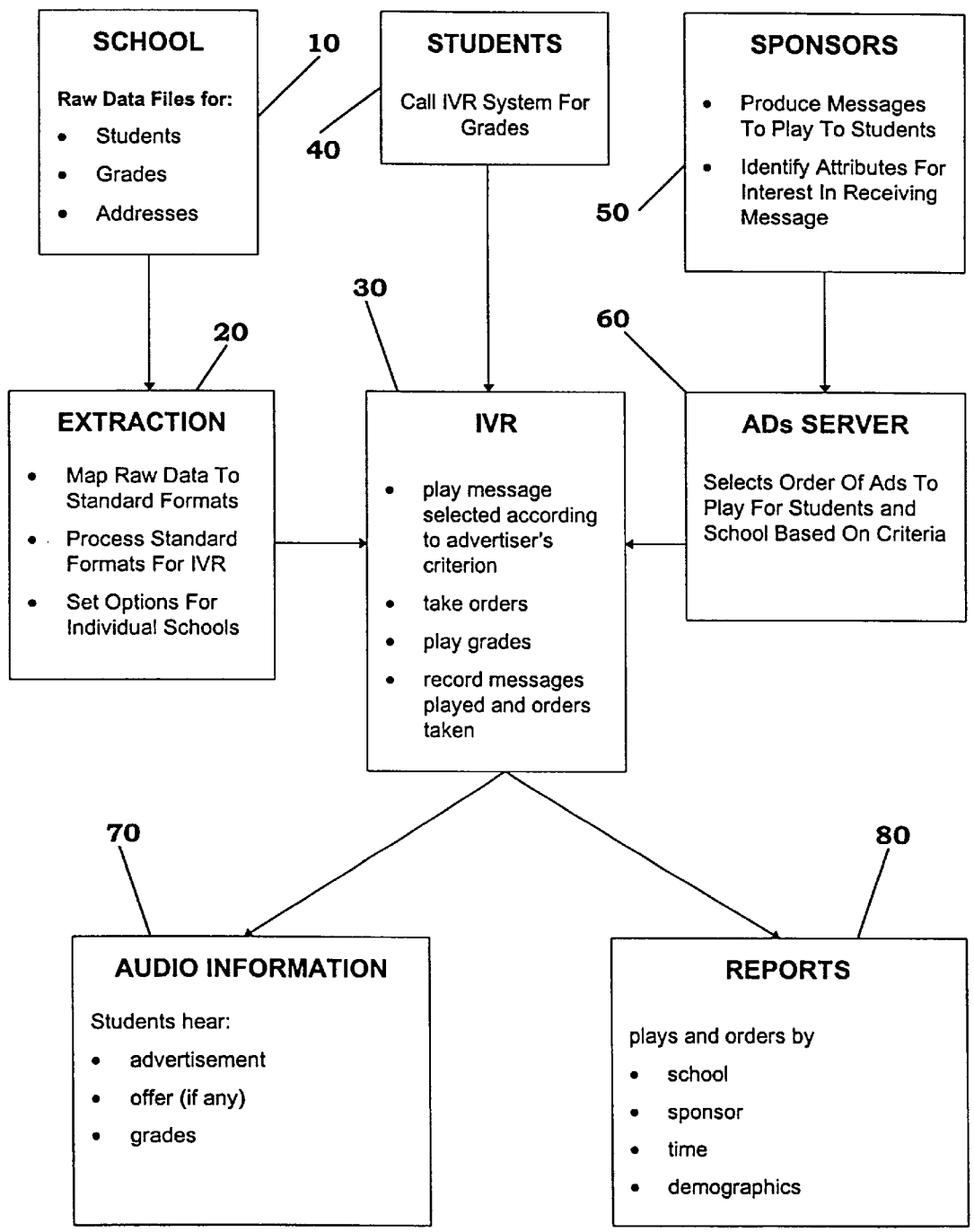
FIG. 1 shows an information delivery system that uses interactive voice response equipment according to the present invention.

FIG. 1 shows one way for implementing the present invention. A customer base, such as a school, supplies raw data files at 10. These files include the identity of students, their grades and their addresses. This information is retained in whatever form the school normally retains the information. This format is most likely incompatible with other uses of the information since there are many possible formats for presenting this data. Therefore, the raw data files are mapped into standard formats at extraction 20 for use by IVR equipment. The format of the data reports corresponds to that needed for standard IVR applications. In addition, individual schools may select different options for the audio playback. These options can be programmed into the data stream at the extraction process.

As contemplated, the extraction 20 can readily map any raw data files supplied by the school at 10 into the format needed for the present IVR application. It is to be appreciated that converting the data files into a standard IVR format permits the same IVR box to be used with different types of raw data files from many different sources. Mapping permits economies of scale to be achieved by reusing the IVR applications for multiple schools.

Individual students call to receive their grades at indicated at 40 in FIG. 1. The students call is supplied to the IVR system 30. The IVR 30 plays a message at 70 that has been selected according to criterion established by sponsors. The sponsor's message may include an offer to take an order for the product being promoted by the sponsor. The student must listen to the message and has the option of whether or not to take an order. Subsequently, the student's grades are played. A record is maintained of messages played and orders taken so that neither the same advertisement nor the same order for the same student are taken twice.

The length of time required to play the advertising message at step 30 is significant. Students generally will not tolerate a message being played for more than 30–45 seconds before they become annoyed. Therefore, the message play must be kept short for the message delivery and order taking to remain efficient. Furthermore, deciding which message to play to a given student may require some time to compute and to be accessed at the IVR 30. Students become annoyed if more than about 15 seconds is required to initiate the advertisement. Therefore, it is preferred that the advertising messages to be played to a student be computed in advance of the student 40 calling the IVR system 30.

Sponsors 50 produce advertising messages that are to be played to students. As shown in FIG. 1, a single sponsor, 50, produces the messages and identifies the attributes of a student who will be most interested in receiving the message. It is to be appreciated that the present invention contemplates serving multiple sponsors; however, the procedure for handling each sponsor will be that described herein.

The messages produced by the sponsor 50 are placed on either the ADs server 60 or the IVR 30. One function of the ADs server is to select the order of ads to be played for the students based on the criteria established by the attributes identified by the sponsor. Concentrating the ad selection process facilitates easier revision to the message selection criterion.

The primary function of the ADs server is to identify advertising messages and grade reports so that the IVR system 30 can play them to the students 40. However, as disclosed herein, the ADs server also determines which advertising messages are to be played to which students and in which order.

The raw data files received from the school can be delivered in any suitable medium, including magnetic tape, floppy disks, and telecommunications links. The extraction process can be accomplished using any suitable computer system such as those able to run Excel spreadsheets made by the Microsoft Corporation. The ADs server can be any suitable computer server system and, at present, is most often implemented using Pentium based microprocessors. The IVR system 30 can be implemented using any of several known IVR "boxes"that are well known in the industry. These systems use Pentium PC based SCO—Unix operating systems with dialogic telephony boards with RAD systems for hard drives. The system is maintained using an APEX software platform.

The present invention allows for producing several forms of outputs. The IVR system 30 generates audio information that is played to the students. This information includes, first, an advertising message for the sponsors product or service. Next, there is an invitation, called an "offer", to purchase the sponsor's product or service. This offer may not be included in the audio information. However, it has been found that providing for accepting an offer is a particularly effective way of promoting the sponsor's product or service. Finally, the grades of the student are read out course-by-course.

Another important output of the present invention is a report that is supplied to the sponsors that shows what, exactly, their advertising money is buying. Advertisers expect that such a report will include a record of (1) which advertisements were played (2) to which students (3) at which schools which then (4) resulted in orders (if applicable). The present invention meets this need by generating reports that identify (1) the school at which the student is attending, (2) the sponsor of the advertisement, (3) the time the advertisement was played to the student, as well as (4) the number of times different messages were played, (5) the demographics of the student receiving the messages and (6) the demographics of any orders that have been taken. The sponsors can then use this information to further enhance their marketing abilities so as to identify those students who are interested in receiving their products or services. Alternately, sponsors can use the information to reassess the effectiveness of their advertising messages.

Figure 2:
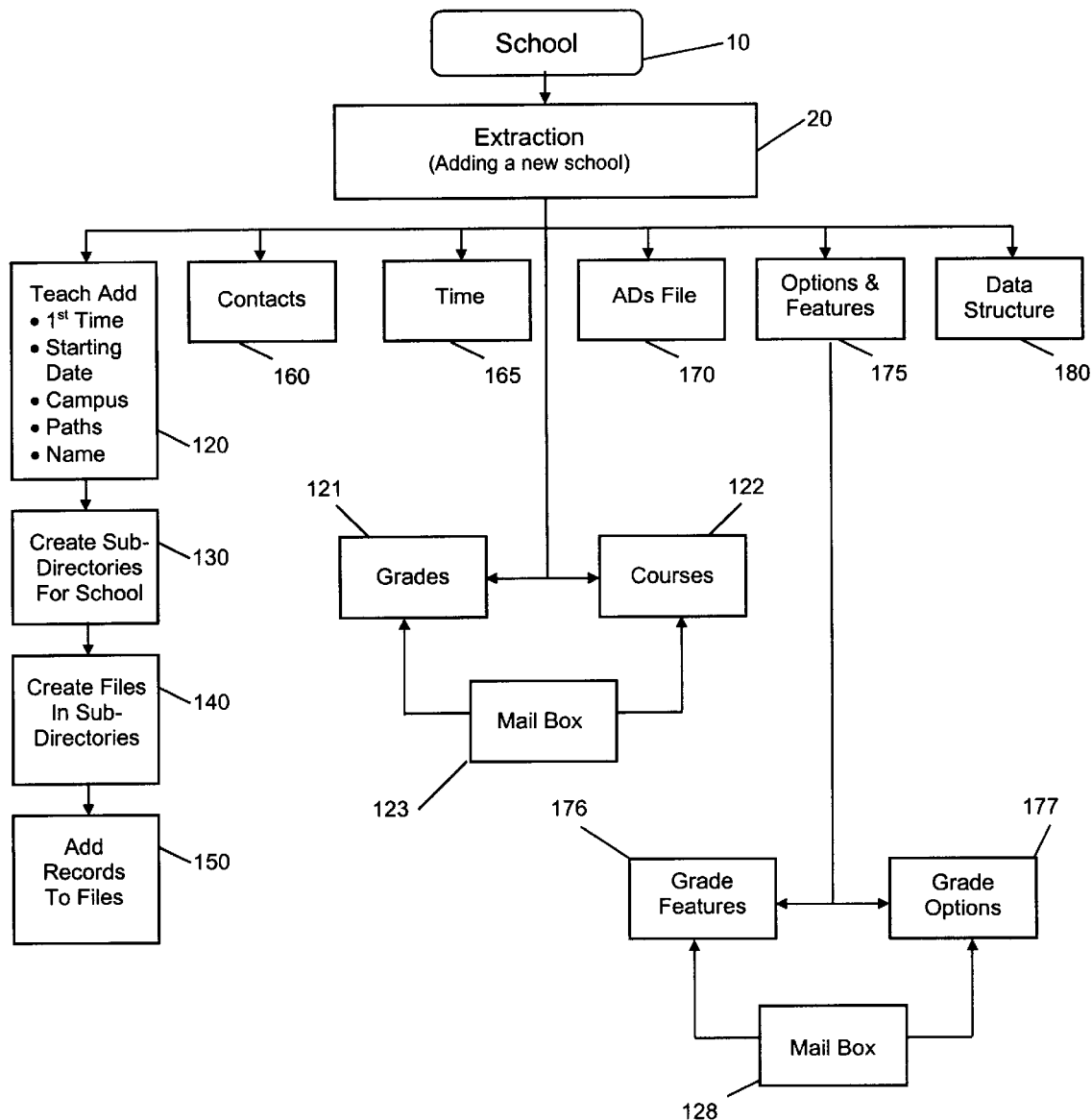
FIG. 2 shows how to map raw data files into a format that is useful for the information delivery system shown in FIG. 1.

FIG. 2 shows the process for mapping the data from schools 10 into a format suitable for use by the IVR system 30 shown in FIG. 1. Extracting the data at 20 is illustrated for purposes of adding a new school to the information delivery network shown in FIG. 1. Teaching the extraction process how to add the school's information to the appropriate portions of the database begins at 120. This information includes the starting date, the campus, the paths in the file and the name, number and code corresponding to the particular university and can be implemented in any of several ways. One advantageous way involves a series of pull down menus that prompt an operator to identify the location, in the school's data file, of the information needed by the information delivery network.

Create subdirectories for the particular school. Next, at step 140, files are created in the subdirectories. These files can include, for example, the identification of the course, the grade obtained in the course, as well as background information such as identification information (e.g., the student's social security number), address, grade-point average, and any other associated information such as major, department, etc. This information is added to the appropriate records file at 150.

It is also desirable to record the contact person at a particular school or institution so as to facilitate at 160. Likewise, it is necessary to record the times at which the particular school will be reporting its grades. It may be optimal to have different schools play different advertising messages for the same sponsor. The advertiser's preferences for particular schools can be recorded at step 170. The structure of the school's data file can be input at 180. This structure includes the location in the data fields for the student's address, grades, and identifying information such as social security numbers, personal identification numbers (PINs) and the like.

It is contemplated in the present invention that data concerning individual schools and individual students will arrive separately from data concerning grades and courses. The format for the grades can be accommodated at 121 and the form for the courses can be accommodated at 122. Individual schools will identify different courses in different ways—sometimes by course number, sometimes by course name and sometimes by hybrids (e.g., chemistry 101). The school's preference for the way it reports its grades can be identified at 122.

Likewise, the grades and course descriptions will change during a grade reporting period. As individual professors send in their grades for their respective courses. This possibility is accommodated by permitting mail from mailbox 123 to update the records of grades and courses.

Individual schools require a number of different options and features which are accommodated at 175 in FIG. 2. These options and features include grade features at 176 and grade options at 177. Different schools report grades differently—sometimes a letter, sometimes a number and sometimes combinations thereof (e.g., B+, B−, etc.). The features of a school's individual grading system accommodated and are at 176. Likewise, schools can configure their grades differently depending on which professor and which department is reporting. Such inter-school variability is accommodated at 177. The ability to update grade features and grade options is accommodated by way of mailbox 128.

Figure 3:
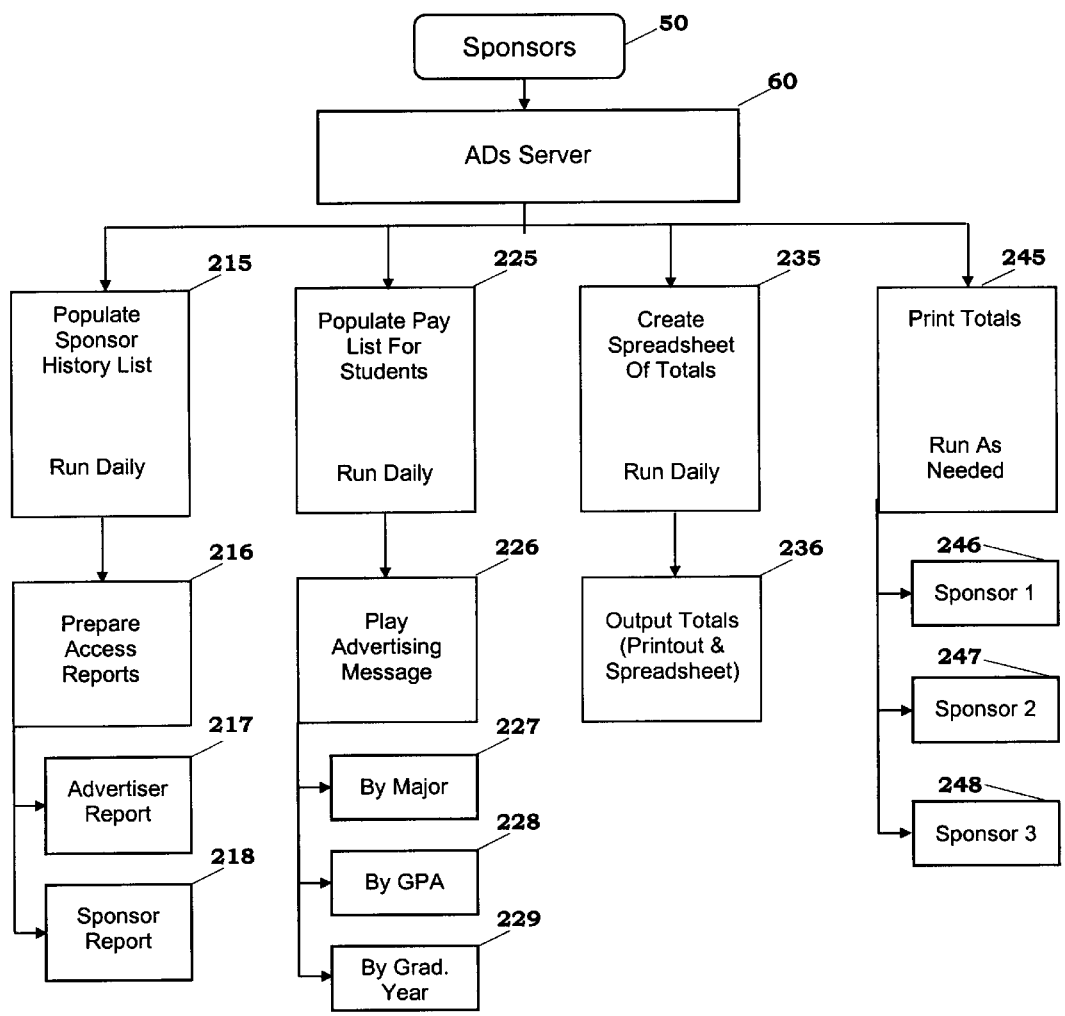
FIG. 3 shows how to generate and monitor the delivery of advertising messages in the information delivery system shown in FIG. 1.

FIG. 3 shows the operation of the ADs server 60 shown in FIG. 1. Sponsors 50 supply advertising messages that are placed on the ADs server 60. The sponsors 50 also supply attributes that will be used to determine the messages and offers directed to individual students. FIG. 3 illustrates the simplified case in which only one of three attributes 227–229 are used to select the message. The attributes, major or field of study 227, grade-point average (GPA) 228 and graduation year 229, it being understood that any number of attributes might be used to direct advertising messages.

The ADs server 60 is accomplished by populating the "play list" for students at step 225. The "play list" can be computed each time a consumer, such as a student, accesses the IVR 30. However, it is thought preferable to calculate the play list in advance for each consumer and to store the resulting play list until it is accessed by a call to the IVR 30. Such advanced calculation allows the advertising message to be played more rapidly when the consumer, e.g., the student, calls the IVR system 30 and thus reduces the time needed to actually deliver the advertising message and other information.

As shown in FIG. 3, the advertising message is played to the student at 226 according to one of the three exemplified criteria 227, 228, 229, respectively, selected by the sponsor 50. Other methods of populating the play list using the consumer's known attributes are possible.

The ADs server also maintains a history list of sponsors whose ads have been played to students. The history list 215 is converted into an access report at step 216. The access report can have any of several formats; two formats are exemplified in FIG. 3. An advertiser report 217 is useful for showing the activity of all sponsors supporting the information delivery system. A sponsor report 218 shows the activity of any one sponsor.

It is also desirable to create a spreadsheet of totals for the number of sponsors messages played for each school broken down by consumer attribute. These statistics can be created in a spreadsheet at 235 and output either as a spreadsheet or in some other desired print out form. An Excel spreadsheet is a suitable format for this information.

The history list of the sponsor 215, the play list 225 and the spreadsheet of totals 235 are operations that can be performed daily. In addition, reports can be generated for individual sponsors at 245. These reports can include break downs for the number of advertising messages played at each school by each consumer attribute. Alternately, these reports can be generated in any other way that the sponsor believes can aide in improving its message. Reports can be tailored to individual sponsors at 246–248 as desired by the sponsor.

Figure 4:
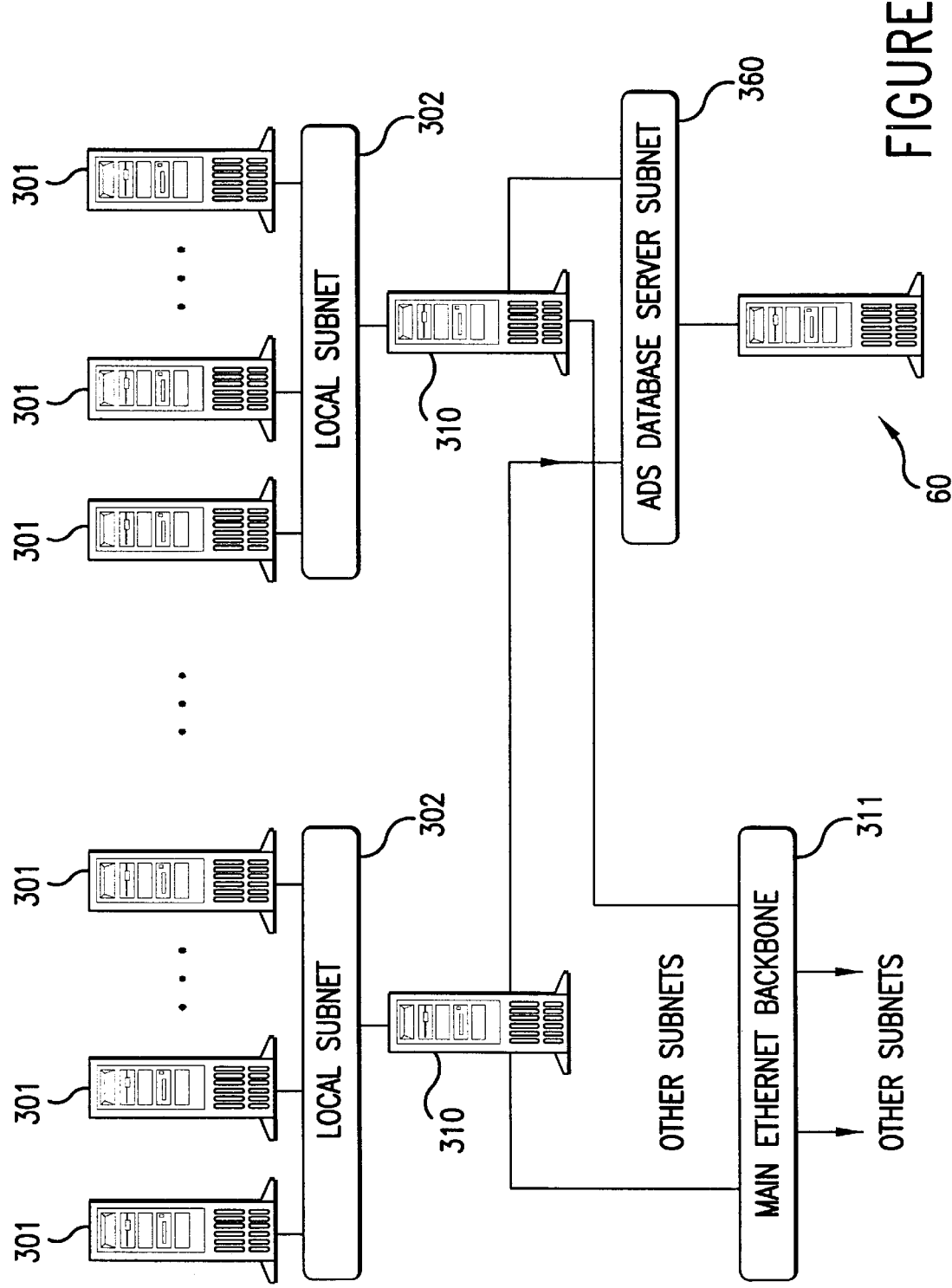
FIG. 4 shows a network of interactive voice response systems for implementing the present invention.

FIG. 4 shows the network typology and database design for the ADs server of the present invention. A plurality of IVR boxes 301 are arranged on local subnets 302 as indicated. Each of the IVR boxes can connect to a plurality of telephone lines, not shown in FIG. 4. As explained below, each of the IVR boxes 301 could serve as the IVR box 30 in FIG. 1, and it is contemplated that different IVR boxes may answer the telephone inquiry from the same consumer, e.g., student, when that student calls in at different times since multiple, redundant copies of the audio information 70 can be maintained on more than one IVR box 301.

One or more IVR gateways 310 connect the local subnets 302 to a main Ethernet backbone 311 as shown. In addition, the gateways 310 connect the local subnets 2 and ADs database server subnet 360 that includes one or more ADs servers 60.

In operation, an IVR box 301 requests the next advertising message for a given student at a particular school. This request is queued and the IVR box 301 waits for a reply. The ADs server 60 reads input requests from its queue, performs database queries with associated processing and formats an application response. The response is then placed in a queue at ADs server 60 and delivered back over the network to the IVR boxes 301. In one embodiment of the invention, each IVR box 301 retains a complete copy of all voice messages that can be played to a consumer that is capable of accessing a phone line directed to the IVR box. Distributing voice messages among the IVR boxes 301 serves to reduce network traffic and thus reduces the delay experienced by a customer placing a call. However, it should be possible to incorporate a voice server into the ADs database server 60 so as to deliver the appropriate voice message to the IVR boxes 301. The appropriate distribution of voice messages within the network depends on the speed of the network, the response time desired for the voice messages, etc., and is considered to be within the level of skill of one of ordinary skill in the art to optimize.

Referring again to FIG. 4, the software for the gateways 310 can run on a single IVR gateway system and then be migrated to a full client server as the needs of the network grow. Each IVR box 301 can make a request from ADs server 60. Similarly, each IVR box 301 can designate the ADs server 60 as having the post name to its designated IVR gateway system. Hence, network maintenance can be removed from the IVR application.

Under one implementation of the invention, an IVR box 301 receives a call from a student. The IVR box identifies which school the student attends from the toll-free phone number used to call the IVR box. The student is then prompted to input his or her identification number. The IVR box is programmed with a maximum number of advertising messages to play to the student as well as the maximum duration of any particular advertising message (these variables may be unique to a particular school). This information is encoded and transmitted over the network to the ADs server 60. In response, the ADs server 60 returns a message containing the school code, the student identification information and a list of the ads that are to be played in the order in which they are to be played. The IVR box 301 then returns information pertaining to the delivery of the advertising message, including an identification of the school, the student's identification and the date and time on which a particular advertising message was played. Also returned to the ADs server is an indication of whether the student responded to any offer presented by the IVR box 301. This information is then compiled for use in reports as discussed previously.

The ADs server 60 uses the information returned from the IVR box 301 to ensure that the student does not receive the same ad again when calling again even if his or her call is routed through a different IVR box 301. This function is achieved by indexing down the maximum number of ads to be played and by removing the played ads from the list of ads to be played. As contemplated for one implementation, the confirmation by the IVR box 301 of the delivery of an advertising message to the student is contained in the same file as the indication of whether the student accepted any offer made. Combining these messages into a single file reduces the processing and reporting time required to generate reports.

For implementing the present invention in the particular application of student grade reporting, it is contemplated that the ADs server database contain a record for every student from every school served by the system. Each student record contains a command indicating the play list of advertising messages that are to be delivered to the student in the order in which they are to be delivered. In addition, a separate list is maintained in the record to indicate whether any offers made have been accepted as well as to indicate which advertising messages have been delivered. These messages are then removed from the student's play list at the ADs server 30.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously thought of. Numerous variations and changes can be made to the foregoing illustrative embodiments without departing from the scope and spirit of the present invention as set forth in the appended claims.

What is claimed is:

1. A method of directed advertising using an interactive voice response system, comprising:

mapping raw data into a database of standard formats, the raw data including a first type of information and a second type of information, the first type of information consisting of disseminatable information sought by an individual, the second type of information including information that is unique to the individual, including identity information, identifier information and information concerning one or more attributes of the individual, storing a plurality of advertising messages that are in an audio format that is capable of being transmitted over a telephone connection, storing a representation of the first type of information in an audio format that is capable of being transmitted over a telephone connection, selecting from among the plurality of advertising messages at least a first advertising message to transmit first over a telephone connection based on the information concerning the attributes of the individual, receiving a first telephone call from the individual, the telephone call initiated by the individual to obtain the first type of information, the telephone call including having the individual input at least a first piece of input information, determining the identity of the individual by comparing the identity information with the first piece of input information, transmitting the first advertising message to the individual over the telephone connection after determining the identity of the individual, and transmitting the first type of information to the individual over the telephone connection after playing the first advertising message.

2. A method of directed advertising using an interactive voice response system as claimed in claim 1, comprising:

updating the first type of information, selecting from among the plurality of advertising messages at least a second message to transmit first over a telephone connection based on the information concerning the attributes of the individual, receiving a second telephone call from the individual, the telephone call initiated by the individual to obtain the updated first type of information, the telephone call including having the individual again input at least the first piece of input information, transmitting the second advertising message to the individual over the telephone connection after the individual again inputs at least the first piece of input information, transmitting the updated first type of information to the individual over the telephone connection after playing the second advertising message.

3. A method of directed advertising using an interactive voice response system as claimed in claim 2, comprising:

updating the first type of information multiple times, selecting from among the plurality of advertising messages a series of messages to transmit first over a telephone connection based on the information concerning the attributes of the individual, receiving multiple telephone calls from the individual, the telephone calls initiated by the individual to obtain the updated first type of information, the telephone calls including having the individual each time again input at least the first piece of input information, transmitting each of the series of advertising messages to the individual over the telephone connection after the individual inputs at least the first piece of input information, transmitting the last update of the first type of information to the individual over the telephone connection after playing the most recent in the series of advertising messages.

4. A method of directed advertising using an interactive voice response system as claimed in claim 3, wherein each advertising message in the series is different from every other advertising message and each message is removed from the series after being played.

5. A method of directed advertising using an interactive voice response system as claimed in claim 1, comprising:

receiving a second piece of input from the individual after transmitting the first advertising message to the individual, and recording the second piece of information.

6. A method of directed advertising using an interactive voice response system as claimed in claim 5, wherein:

the first type of information includes academic grades for the individual, and the attributes of the individual include major, grade point average and graduation year.

7. An apparatus for directed advertising, comprising:

means for mapping raw data into a database of standard formats, the raw data including a first type of information and a second type of information, the first type of information consisting of disseminatable information sought by an individual, the second type of information including information that is unique to the individual, including identity information, identifier information and information concerning one or more attributes of the individual, means for storing a plurality of advertising messages that are in an audio format that is capable of being transmitted over a telephone connection, means for storing a representation of the first type of information in an audio format that is capable of being transmitted over a telephone connection, means for selecting from among the plurality of advertising messages at least a first advertising message to transmit first over a telephone connection based on the information concerning the attributes of the individual, means for receiving a first telephone call from the individual, the telephone call initiated by the individual to obtain the first type of information, the telephone call including having the individual input at least a first piece of input information, means for determining the identity of the individual by comparing the identity information with the first piece of input information, means for transmitting the first advertising message to the individual over the telephone connection after determining the identity of the individual, and means for transmitting the first type of information to the individual over the telephone connection after playing the first advertising message.

8. An apparatus for directed advertising as claimed in claim 7, comprising:

means for updating the first type of information, means for selecting from among the plurality of advertising messages at least a second advertising message to transmit first over a telephone connection based on the information concerning the attributes of the individual, means for receiving a second telephone call from the individual, the telephone call initiated by the individual to obtain the updated first type of information, the telephone call including having the individual again input at least the first piece of input information, means for transmitting the second advertising message to the individual over the telephone connection after individual again inputs at least the first piece of input information, means for transmitting the updated first type of information to the individual over the telephone connection after playing the second advertising message.

9. An apparatus for directed advertising as claimed in claim 8, comprising:

means for updating the first type of information multiple times, means for selecting from among the plurality of advertising messages a series of messages to transmit first over a telephone connection based on the information concerning the attributes of the individual, means for receiving multiple telephone calls from the individual, the telephone calls initiated by the individual to obtain the updated first type of information, the telephone calls including having the individual each time again input at least the first piece of input information, means for transmitting each of the series of advertising messages to the individual over the telephone connection after the individual inputs at least the first piece of input information, means for transmitting the last update of the first type of information to the individual over the telephone connection after playing the most recent in the series of advertising messages.

10. A method of directed advertising using an interactive voice response system as claimed in claim 9, wherein each advertising message in the series is different from every other advertising message and each message is removed from the series after being played.

11. An apparatus for directed advertising as claimed in claim 7, comprising:

means for receiving a second piece of input from the individual after transmitting the first advertising message to the individual, and means for recording the second piece of information.

12. An apparatus for directed advertising as claimed in claim 11, wherein:

the first type of information includes academic grades for the individual, and the attributes of the individual include major, grade point average and graduation year.

13. A method of directed advertising using an interactive voice response system, comprising:

mapping raw data into a database of standard formats, the raw data including a first type of personal information and a second type of personal information, the second type of personal information including information that is unique to a particular individual, including identity information, identifier information and information concerning one or more attributes of the individual, storing a plurality of advertising messages that are in an audio format that is capable of being transmitted over a telephone connection, storing a representation of the first type of personal information in an audio format that is capable of being transmitted over a telephone connection, selecting from among the plurality of advertising messages at least a first advertising message to transmit first over a telephone connection based on the information concerning the attributes of the individual, receiving a first telephone call from the individual, the telephone call including having the individual input at least a first piece of input information, determining the identity of the individual by comparing the identity information with the first piece of input information, transmitting the first advertising message to the individual over the telephone connection after determining the identity of the individual, and transmitting the first type of personal information to the individual over the telephone connection after playing the first advertising message.

14. A method of directed advertising using an interactive voice response system as claimed in claim 13, comprising:
- updating the first type of personal information,
- selecting from among the plurality of advertising messages at least a second message to transmit first over a telephone connection based on the information concerning the attributes of the individual,
- receiving a second telephone call from the individual, the telephone call including having the individual again input at least the first piece of input information,
- transmitting the second advertising message to the individual over the telephone connection after the individual again inputs at least the first piece of input information,
- transmitting the updated first type of personal information to the individual over the telephone connection after playing the second advertising message.

15. A method of directed advertising using an interactive voice response system as claimed in claim 14, comprising:
- updating the first type of personal information multiple times,
- selecting from among the plurality of advertising messages a series of messages to transmit first over a telephone connection based on the information concerning the attributes of the individual,
- receiving multiple telephone calls from the individual, the telephone calls including having the individual each time again input at least the first piece of input information,
- transmitting each of the series of advertising messages to the individual over the telephone connection after the individual inputs at least the first piece of input information,
- transmitting the last update of the first type of personal information to the individual over the telephone connection after playing the most recent in the series of advertising messages.

16. A method of directed advertising using an interactive voice response system as claimed in claim 15, wherein each advertising message in the series is different from every other advertising message.

17. A method of directed advertising using an interactive voice response system as claimed in claim 13, comprising:
- receiving a second piece of input from the individual after transmitting the first advertising message to the individual, and
- recording the second piece of information.

18. A method of directed advertising using an interactive voice response system as claimed in claim 17, wherein:
- the first type of personal information includes academic grades of the individual, and
- the attributes of the individual include major, grade point average and graduation year.

* * * * *